United States Patent
Rouphael et al.

(10) Patent No.: US 6,301,291 B1
(45) Date of Patent: Oct. 9, 2001

(54) PILOT SYMBOL ASSISTED MODULATION AND DEMODULATION IN WIRELESS COMMUNICATION SYSTEMS

(75) Inventors: Antoine J. Rouphael, Melbourne; John E. Hoffmann; James A. Proctor, Jr., both of Indialantic; George Rodney Nelson, Jr., Merrit Island, all of FL (US)

(73) Assignee: Tantivy Communications, Inc., Melbourne, FL (US)

( * ) Notice: Subject to any disclaimer, the term of this patent is extended or adjusted under 35 U.S.C. 154(b) by 0 days.

(21) Appl. No.: 09/497,440

(22) Filed: Feb. 3, 2000

(51) Int. Cl.⁷ .................................................. H04B 1/707
(52) U.S. Cl. ........................ 375/150; 375/152; 375/281; 375/332; 375/343
(58) Field of Search ................................. 375/150, 152, 375/281, 329, 332, 343, 362, 365, 367; 370/320, 335, 342, 441

(56) References Cited

U.S. PATENT DOCUMENTS

| | | |
|---|---|---|
| 5,329,547 | 7/1994 | Ling . |
| 5,619,524 | 4/1997 | Ling et al. . |
| 5,809,009 * | 9/1998 | Matsuoka et al. ............. 370/206 |
| 5,920,551 | 7/1999 | Na et al. . |
| 6,064,690 * | 5/2000 | Zhou et al. ..................... 375/150 |
| 6,208,632 * | 3/2001 | Kowalski et al. .............. 370/335 |

OTHER PUBLICATIONS

Pilot Symbol Assisted BPSK on Rayleigh Fading Channels with Diversity: Performance Analysis and Parameter Optimization; Schramm and Müller, *IEEE Transactions on Communications,* vol. 46, No. 12, Dec. 1998, 1560–1563.

Analysis and Optimization of Pilot–Channel–Assisted BPSK for DS–CDMA Systems, Schramm, IEEE Transactions on Communications vol. 46, No. 9, Sep. 1998, 1122–1124.

Optimum and Suboptimum Frame Synchronization for Pilot–Symbol–Assisted Modulation; Gansman, Fits and Krogmeier, IEEE Transactions on Communications, vol. 45, No. 10, Oct. 1997, 1327–1337.

* cited by examiner

*Primary Examiner*—Don N. Vo
(74) *Attorney, Agent, or Firm*—Darby & Darby

(57) ABSTRACT

A transmitter which includes a quadrature phase shift keying (QPSK) modulator, and a receiver which includes a pilot correlation filter (PCF), a data matching filter (DMF), a timing recovery mechanism, a sampler, and a QPSK demodulator are provided in a wireless communication system. The transmitter transmits a frame of data symbols and pilot symbols to a receiver in a wireless system. The pilot symbols are inserted in the frame at known time intervals. The QPSK modulator modulates the frame of data and pilot symbols. As the receiver receives the frame of data and pilot symbols from the transmitter, the PCF recovers the pilot symbols sent by the transmitter, whereas the timing recovery mechanism tracks the timing of the pilot symbols in the frame. The DMF enhances the multipath response of the frame of data and pilot symbols at the known time intervals of the pilot symbols, and outputs a plurality of enhanced peaks. The sampler samples the multipath response of the frame of data and pilot symbols at each of the enhanced peaks. The QPSK demodulator demodulates the sampled frame of data and pilot symbols and recovers the data symbols using QPSK demodulation based on the sampled frame.

19 Claims, 10 Drawing Sheets

FRAME STRUCTURE

PILOT SYMBOL ASSISTED MODULATION AND DEMODULATION IN WIRELESS COMMUNICATION SYSTEMS

FIELD OF THE INVENTION

The present invention relates to a code division multiple access (CDMA) communication system and, more particularly, to pilot symbol assisted modulation and demodulation in the forward and reverse links of such a CDMA communication system.

DESCRIPTION OF THE RELATED ART

Code Division Multiple Access (CDMA) modulation, which is known in the art, is a multi-user access transmission scheme in which the signals of different users overlap both in frequency and in time. This is in contrast to Frequency Division Multiple Access (FDMA), also known in the art, in which the signals of users overlap in time, but are assigned unique frequencies, and Time Division Multiple Access (TDMA) in which the signals of users overlap in frequency, but are assigned unique timeslots. According to CDMA, each user is assigned a unique code sequence that is used to modulate the user's signals. This allows the user to spread the information over the entire channel bandwidth, as opposed to particular sub-channel(s) in FDMA. In CDMA, the signal for each user at a mobile station (MS) is spread over a wide bandwidth, which is greater than the minimum bandwidth to transmit the signal. Each user's signal is spread by a different wideband code, each of which are orthogonal to each other. All the spread wideband signals for different users are added together to form a composite signal which is transmitted over the airwaves in the same frequency band. The receiver at a base station (BS) distinguishes among signals from different users by using a copy of the particular wideband code for a user, which is available to both the mobile stations and the base stations in the CDMA system. Such a process is called channelization. In an exemplary IS-95 CDMA system, which is a North American CDMA standard known in the art, channelization in the reverse link, i.e., when a mobile station (MS) is transmitting to a base station (BS) in the system, is accomplished using a wideband code called a pseudorandom noise (PN) code, also known in the art. The receiver at the base station (BS) sifts the desired signal from a particular user out of the composite signal by correlating the composite signal with the original wideband code. All other users having codes that do not match the code for the desired signal from that particular user are rejected.

A central facet of wireless communication systems is the reliability and integrity of the data which are being communicated. Ideally, the data which are being transmitted from a transmitter of a wireless system should be identical to the data which are being received at a receiver thereof. Practically, however, the data which are received at the receiver have often been corrupted with respect to the original data which were transmitted from the transmitter. Such data communication errors may be attributed to many factors, including multipath Rayleigh fading. There are times when a receiver is completely out of range of a transmitter in the CDMA system, i.e., there is no signal path traveling to the receiver. The received signals are made up of a group of reflections from objects, and none of the reflected signal paths is any more dominant than the other ones. The different reflected signal paths arrive at slightly different times, with different amplitudes, and with different phases. Because there are many different signal paths, constructive and destructive interference can result, namely, multipath Rayleigh fading. Furthermore, jitter may also result which prevents proper signal sampling and in turn negatively affects the bit error rate (BER), which is directly related to the signal quality of a transmission path assigned to a particular user.

There is therefore a general need in the art for a wireless system with improved data reception. A wireless system is particularly needed that enhances the signal quality at the receivers and minimizes the negative effects of multipath Rayleigh fading on data reception. There is a further need for a wireless system that prevents the occurrence of jitter with proper sampling and optimized bit error rate (BER).

SUMMARY OF THE INVENTION

The present invention is a method and system of data transmission using pilot symbol assisted modulation and demodulation. A preferred embodiment of the system according to the invention includes a transmitter having a QPSK (quadrature phase shift keying) modulator, and a receiver having a pilot correlation filter (PCF), a data matching filter (DMF), a timing recovery mechanism, a sampler, and a QPSK (quadrature phase shift keying) demodulator. The transmitter transmits a frame of data symbols and pilot symbols to a receiver in a wireless system. The pilot symbols are inserted in the frame at known time intervals. The QPSK modulator modulates the frame of data and pilot symbols using quadrature phase shift keying (QPSK) modulation. As the receiver receives the frame of data and pilot symbols from the transmitter, the PCF recovers the pilot symbols from the frame and produces a multipath response. The timing recovery mechanism tracks the timing of the pilot symbols in the frame. The DMF enhances the multipath response of the frame of data and pilot symbols at the known time intervals of the pilot symbols, and outputs an enhanced multipath response signal with a plurality of enhanced peaks. The sampler samples the enhanced multipath response of the frame of data and pilot symbols. The QPSK demodulator demodulates the sampled frame of data and pilot symbols and recovers the data symbols using quadrature phase shift keying (QPSK) demodulation based on the samples.

In accordance with a preferred embodiment of the method of the invention, a frame of data symbols and pilot symbols are transmitted, where the pilot symbols are inserted in the frame at known time intervals. The frame of data and pilot symbols are modulated using QPSK modulation. Once the frame is received, the pilot symbols are recovered and a multipath response is provided for the received frame at the known time intervals of the pilot symbols through the use of a finite impulse response (FIR) filter. At this point, the multipath response is hump-like in appearance in terms of its amplitude versus time. The multipath response of the received frame is enhanced by time reversal and complex conjugation to provide enhanced peaks of the multipath response. The enhanced multipath response is sampled at each of the enhanced peaks and the data symbols of the received frame are recovered using QPSK demodulation based on the samples.

BRIEF DESCRIPTION OF THE DRAWINGS

These and other features, aspects, and advantages of the invention will become more readily apparent with reference to the following detailed description of a presently preferred, but nonetheless illustrative, embodiment when read in conjunction with the accompanying drawings. The drawings referred to herein will be understood as not being drawn to scale, except if specifically noted, the emphasis instead being placed upon illustrating the principles of the invention. In the accompanying drawings.

DETAILED DESCRIPTION OF THE PREFERRED EMBODIMENTS

Figure 1:
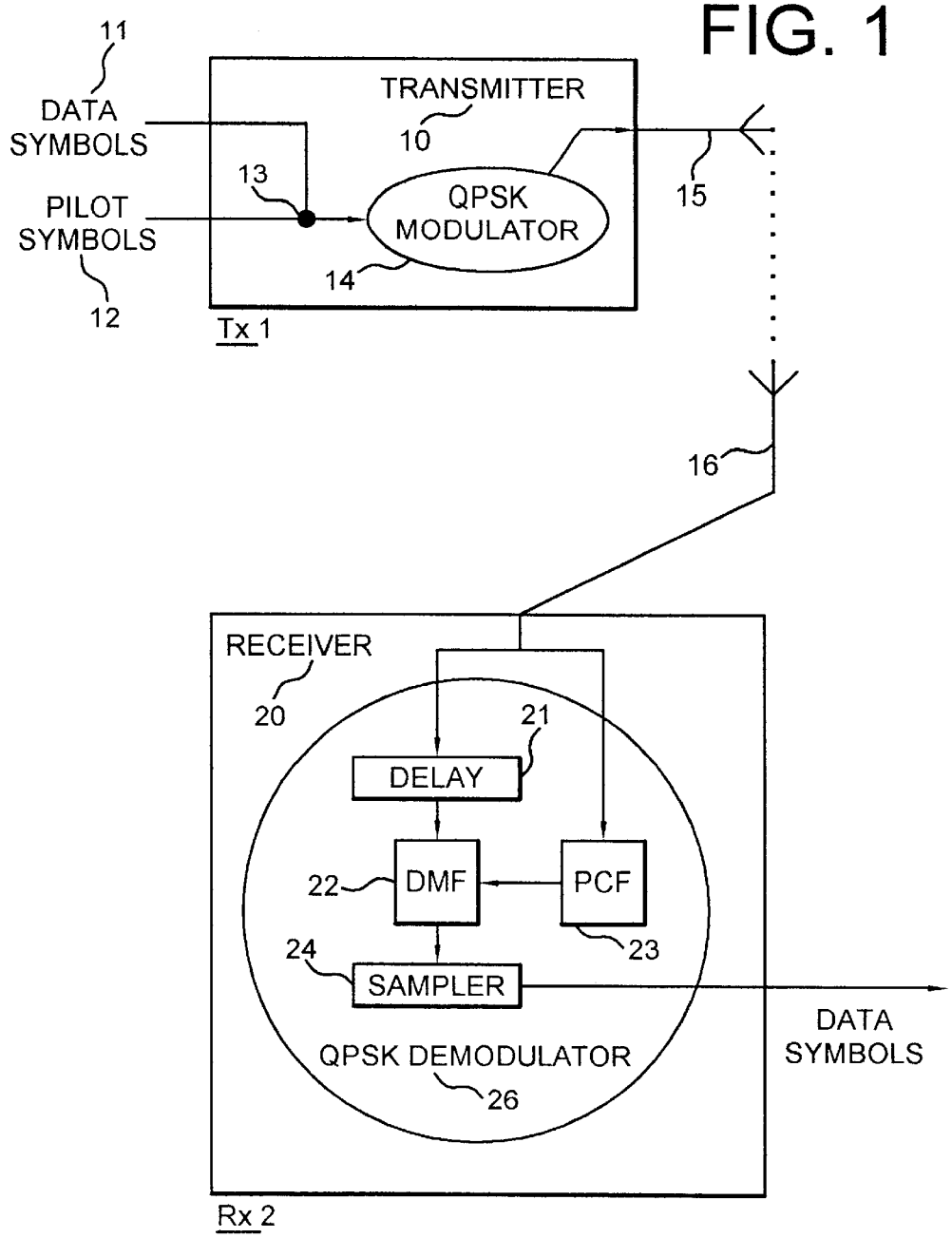
FIG. 1 is a diagram generally illustrating a transmitter and a receiver of a wireless system according to the invention.
Figure 1A:
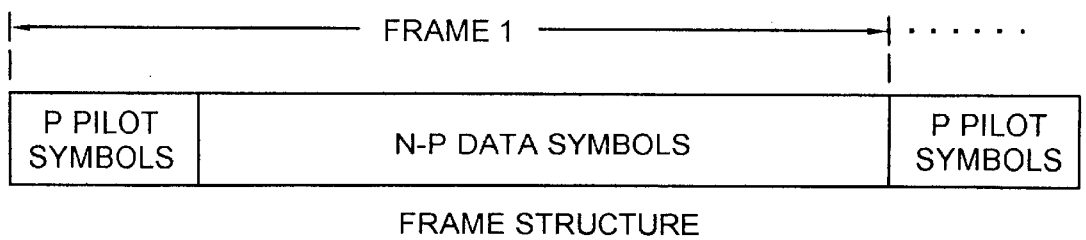
FIG. 1A is a diagram illustrating the frame structure of an exemplary frame of data and pilot symbols being transmitted in accordance with the invention.

FIG. 1 is a diagram that generally illustrates a transmitter 10 and a receiver 20 in a wireless communication system according to the invention. The transmitter 10, Tx 1, includes a QPSK modulator 14 and an antenna 15. The receiver 20, Rx 2, has a QPSK demodulator 26 which includes a delay 21, a data matching filter (DMF) 22, a pilot correlation filter (PCF) 23, and a sampler 24. The transmitter Tx 1 transmits a frame of data symbols 11 and pilot symbols 12 to the receiver Rx 2. In an embodiment of the invention, the transmission is in the reverse link, i.e., from a transmitter in a mobile station (MS) to a receiver in a base station (BS) in the wireless system. However, the transmission can also be in the forward link, i.e., from a transmitter in a base station (BS) to a receiver in a mobile station (MS) in the wireless system. The pilot symbols 12 are inserted (at node 13) in the frame at known time intervals. The pilot symbols 12 are inserted in an exemplary frame 1 as shown in FIG. 1A. P pilot symbols are inserted into frame 1 which has a total of N symbols. The P pilot symbols are inserted in the front end of frame 1, with N-P data symbols appended thereto. In an embodiment of the invention, P=1 and N=7, though it will be appreciated by those skilled in the art that P and N could be any other value without departing from the scope and spirit of the invention. Each symbol can be further divided into smaller sampling units such as "chips" which is a term of art in CDMA. A chip is a unit for a minimum sampling period for a frame of data/pilot symbols. For example, the sampling period for a chip (denoted Tc) in IS-95, which is a North American CDMA standard known in the art, is $$\frac{1}{1,228,800}$$

seconds. The number of samples taken in a chip varies, depending on the CDMA design. For example, one sample can be taken for each chip, or oversampling can be applied to each chip so that a chip includes a plurality of samples. In this particular embodiment according to the invention, each chip in the frame of data/pilot symbols being transmitted is oversampled four times, i.e., there are 4 samples for each chip.

The QPSK modulator 14 modulates the frame of data and pilot symbols (11 and 12) using quadrature phase shift keying (QPSK), known in the art, which is a modulation technique that allows the transmission of two bits of information in each symbol period. QPSK modulation makes use of the quadrature component in addition to the in-phase component of a symbol in the frame being transmitted from the transmitter 10 to the receiver 20. In QPSK, the in-phase component, I, and the quadrature component, Q, can be combined without interfering with each other (i.e., they are orthogonal to each other) which doubles the bandwidth efficiency in comparison with simply transmitting one bit of information in a symbol period. The receiver 20 receives the QPSK-modulated frame of data and pilot symbols (11 and 12) from the transmitter 10 via antennae 15 and 16. The pilot correlation filter PCF 23 recovers the pilot symbols in the modulated frame received from the transmitter 10 and outputs a hump-like multipath response to the data matching filter DMF 22. The multipath response is hump-like at this point due to interference such as multipath Rayleigh fading. After the delay 21 delays the frame received from the transmitter 10, the DMF 22 enhances the multipath response of the frame of data and pilot symbols (11 and 12) at the known time intervals of the pilot symbols recovered by the PCF 23, and outputs a plurality of enhanced peaks. The sampler 24 samples the multipath response of the frame of data and pilot symbols (11 and 12) at each of the enhanced peaks. The QPSK demodulator 26 then completes the demodulation of the sampled frame of data and pilot symbols (11 and 12) and outputs the recovered data symbols. The structure of the transmitter and the receiver, and the multipath response enhancement process according to the invention are described in further detail below.

Figure 2:
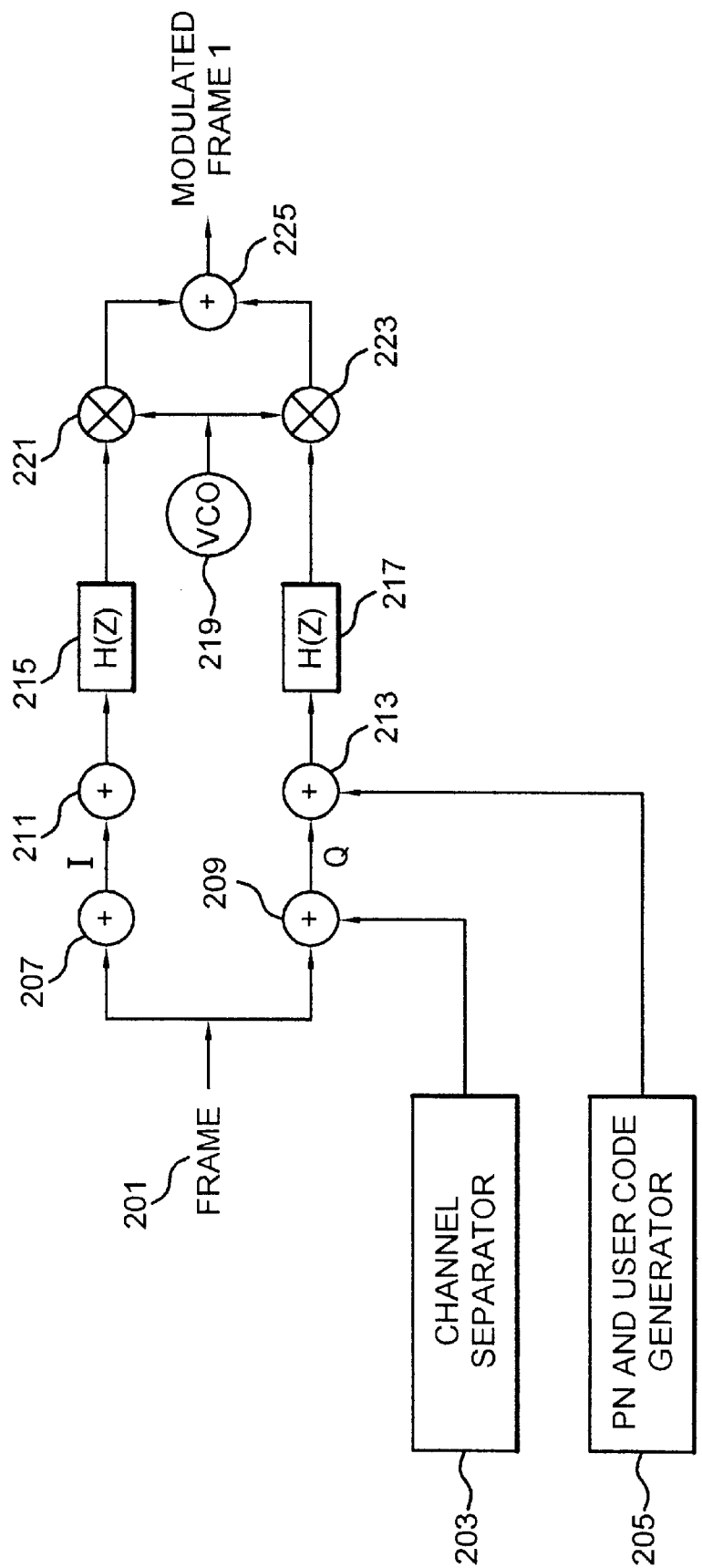
FIG. 2 is a diagram illustrating a QPSK modulator of the transmitter according to the invention.

FIG. 2 is a diagram that illustrates a QPSK modulator of the transmitter 10 according to the invention. The frame 201 of data and pilot symbols (11 and 12 in FIG. 1) is respectively input into the adders 207 and 209. In accordance with QPSK, the channel separator 203, which is connected to the adders 207 and 209, separates or spreads the frame 201 into two data streams (I and Q) by multiplying the frame 201 with cosine and sine carrier waveforms, respectively, which have the same frequency. Pseudorandom noise (PN) and user code generator 205 spreads the frame 201 of data and pilot symbols over the entire bandwidth of the I and Q streams by inserting a PN code {Pn} and a user code at adders 211 and 213. The receiver 20 also possesses a copy of the PN {Pn} code for data recovery. The I and Q streams are bandpass filtered at the filters H(Z) 215 and 217, respectively. An oscillator, VCO 219, generates a carrier waveform which is multiplied with the I and Q streams at multiplier 221 and 223, respectively. The I and Q streams are combined at adder 225 which outputs the modulated frame 1 of data and pilot symbols which are transmitted from the antenna 15 of transmitter 10 to the antenna 16 of the receiver (20 of FIG. 1).

The data received at the receiver Rx 2 which includes the modulated frame 1 can be represented with respect to the PN code {Pn} as a function of time t and the sampling period for a chip Tc in the modulated frame 1. Provided that the PN code is expressed as $$\{Pn\} = \sum_n Pn\delta(t - nTc)$$

for the nth chip for the modulated frame 1, the data received r(t) at the receiver 20 is expressed in the following:

$$r(t) = \sum_n^N d\left\lfloor \frac{n}{N} \right\rfloor Pn\delta(t - nTc) * h(t) + n(t) \qquad \text{Eq. (1)}$$

$$= \sum_n^N d\left\lfloor \frac{n}{N} \right\rfloor Pnh(t - nTc) + n(t)$$

where N is the number of symbols in the modulated frame 1, $$\left\lfloor \frac{n}{N} \right\rfloor$$

represents a flooring or modulo function that approximates $$\frac{n}{N}$$

to the lower of the two integers closest to the fraction $$\frac{n}{N}, \quad d\left\lfloor \frac{n}{N} \right\rfloor$$

represents encoded bits for the nth chip in the modulated frame 1, δ is a function of white noise (a factor known in the art), h(t) represents the channel and filtering effects (as a function of time t) in the data transmission path between the transmitter 10 and the receiver 20, and n(t) represents noise (as a function of time t) in the data transmission path between the transmitter and receiver. White noise is an approximation of the noise and/or interference that naturally occurs in data transmission, including thermal noise, which is produced by the random motion of electrons in the transmission medium, and shot noise, which is the variation around the average value of a current of discrete pulses between two points in the transmission medium. The flooring or module function $$\left\lfloor \frac{n}{N} \right\rfloor$$

needed because the data symbols and the PN code have different transmission rates. Assuming that the modulated frame 1 has N=32 symbols, the effect of the flooring or modulo function $$\left\lfloor \frac{n}{N} \right\rfloor$$

is to ensure that d (which represents the encoded bits for the nth chip) stays constant for each chip in the modulated frame 1 until the full frame of N–32 symbols is processed.

Figure 3:
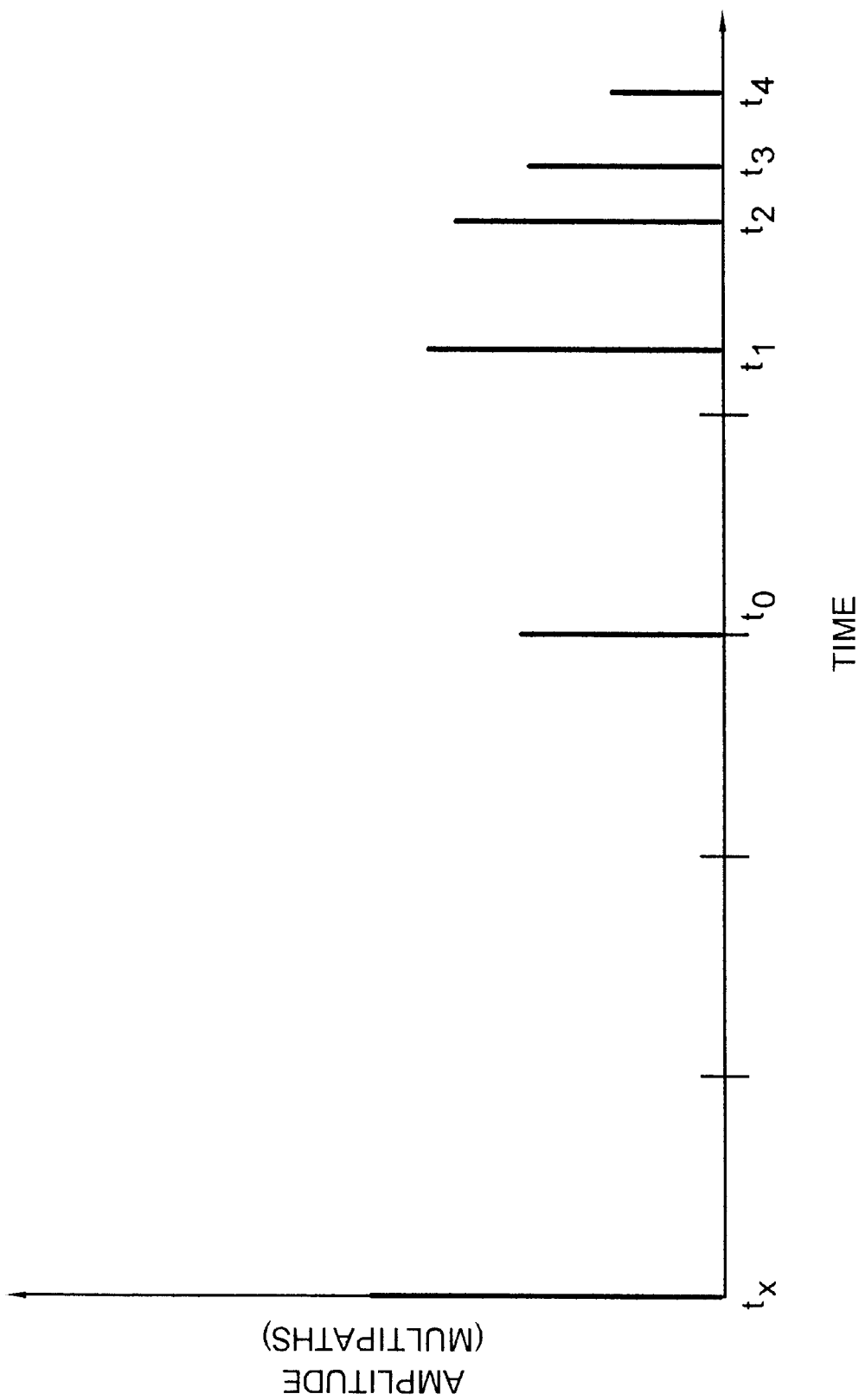
FIG. 3 is a diagram illustrating an exemplary multipath response of communicating a frame of data from a transmitter to a receiver in a wireless system.

FIG. 3 is a diagram that illustrates an exemplary multipath response of communicating a frame of data from a transmitter to a receiver in a wireless system. After the frame (201 of FIG. 2) is modulated, the transmitter (10 of FIG. 1) transmits the modulated frame at time $t_x$. The receiver (20 of FIG. 1) receives a series of pulses or peaks at t0, t1, t2, t3 and t4 which represent the modulated frame 1 of data and pilot symbols transmitted from 20, but received at the receiver 20 over various transmitter paths of different length.

The receiver having a QPSK demodulator according to the invention enhances the multipath response in the received modulated frame and recovers the original data symbols. In a preferred embodiment of the invention, the multipath response is enhanced by selecting the best three impulses or peaks received for each modulated frame and sampling the response at the enhanced peaks, which are described in further detail below.

Figure 4:
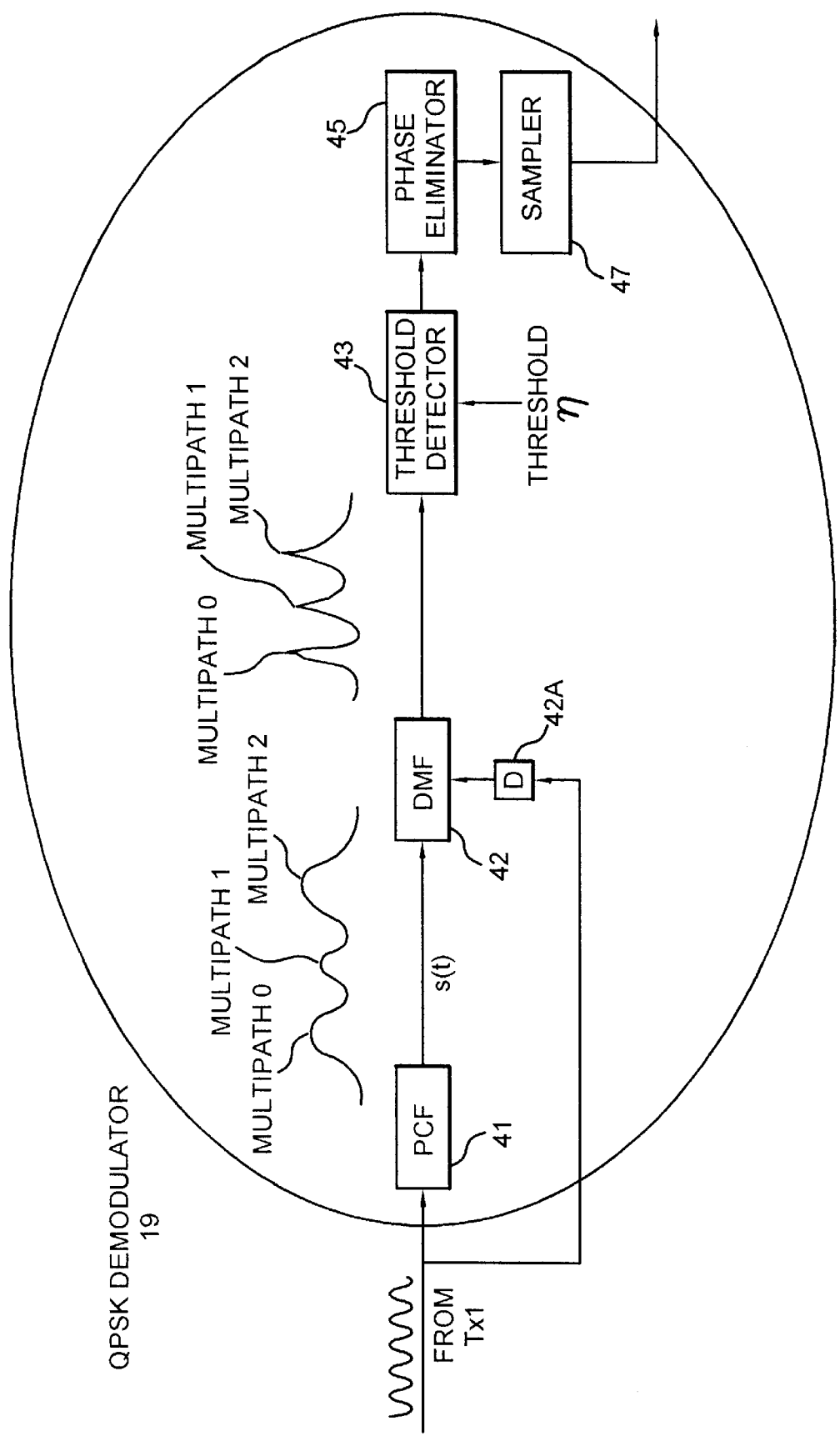
FIG. 4 is a diagram illustrating an exemplary QPSK demodulator having a data matching filter that enhances the multipath response in a receiver according to the invention.

FIG. 4 is a diagram illustrating an exemplary QPSK demodulator having a data matching filter (DMF) that enhances the multipath response in a receiver according to the invention. Referring to FIG. 4, there is shown an embodiment of the QPSK demodulator 26 of FIG. 1 including a pilot correlation filter PCF 41, a data matching filter DMF 42 with a delay 42A, a threshold detector 43, a phase estimator 45, and a sampler 47. PCF 41 receives the modulated frame of pilot and data symbols from the transmitter 10 and generates a multipath response having exemplary multipath responses 0, 1 and 2 based on the PN code {Pn} as originally input at the transmitter 10 and known at the receiver 20. Multipaths 0, 1 and 2 are pulses which are respectively received by the receiver 10 at time t0, t1 and t2(FIG. 3) because of travel over different length transmission paths. For example, for one symbol in the modulated frame 1, the data received r(t) at the receiver 20 can be expressed, based on Equation (1), as follows:

$$r(t)=d_0P_0h(t)+d_0P_1h(t-Tc)+ \ldots +d_0P_{N-1}h(t-Tc) \qquad \text{Eq.(2)}$$

Because of noise n(t) and channeling/filtering effects h(t), multipaths 0, 1 and 2 are hump-like in appearance, which is not suitable for data or symbol recovery at the receiver 20 because it is difficult to find a clear peak for the humps in the received multipath response. If sampling of the hump-like multipath response is performed at this juncture, jitter will most likely result which prevents optimal sampling at the proper response peaks, which in turn adversely affects the bit error rate (BER). After a delay operation on the modulated frame from transmitter 10 at the delay 42A, DMF 42, using a complex conjugation and time reverse operation, denoted by the function h(t), enhances the multipath response of s(t) by shaping or sharpening the hump-like multipaths 0, 1 and 2 into narrow spikes or peaks which are better suited for data symbol recovery. Using a threshold η, the threshold detector 43 selects the spike-like multipaths or peaks over the threshold η, which is described in further detail below. Since the frame is QPSK modulated, the phase for each peak selected is estimated at the phase estimator 45 which then outputs the enhanced multipath response for sampling at the enhanced peaks by the sampler 47.

Figure 5:
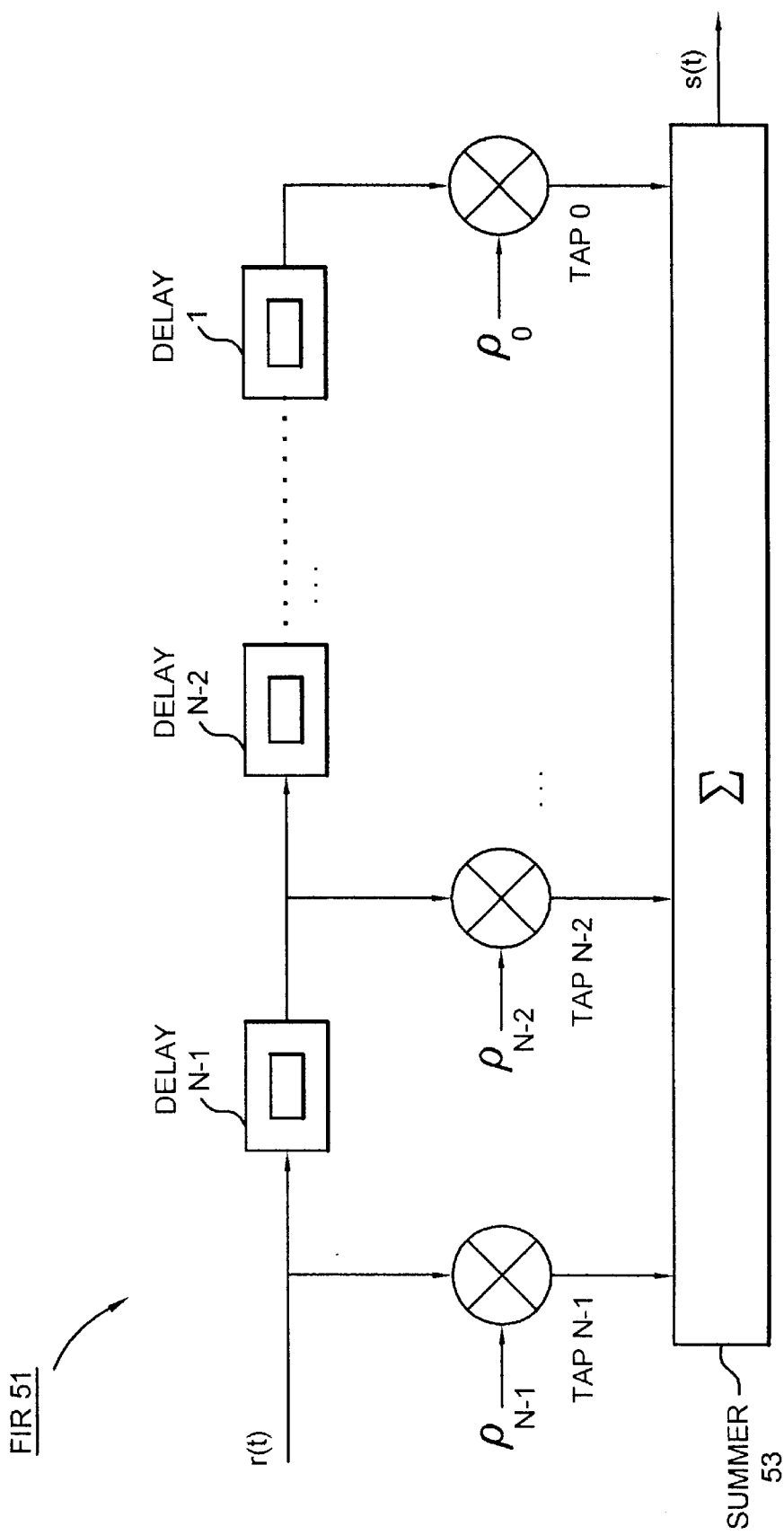
FIG. 5 is a diagram illustrating an exemplary pilot correlation filter according to the invention.

FIG. 5 is a diagram illustrating in further detail an exemplary pilot correlation filter (e.g., PCF 41 of FIG. 4) according to the invention. PCF 41 is a pilot correlation filter comprising a finite impulse response (FIR) filter 51 and a summer 53. The function of the pilot correlation filter (e.g., PCF 41) is to recover the data symbols and resolve the multipath response of the data received r(t) at the receiver 20 into a plurality of multipath components, e.g, multipaths 0, 1 and 2. An exemplary pilot correlation filter according to the invention employs a passive correlation technique by utilizing FIR filter 51 with a plurality of taps. An exemplary FIR filter (FIR 51), as shown in FIG. 5, comprises N taps for decoding a pilot symbol in the modulated frame 1 (FIG. 1A) with an input of the PN code known at both the transmitter and the receiver, specifically PN coefficients {P0, P1, . . . Pn−1} for the tap 0, tap 1, . . . , and tap N−1, respectively. FIR 51 further comprises delays N−1, N−2, . . . , and 1 for processing the pilot symbols in the modulated frame 1. The data received r(t) at the receiver 20 are input into both the taps (tap N−1, tap N−2, . . . , and tap 0) and the delays (N−1, N−2, . . . , and 1), where the received data r(t) undergoes a delay operation next to each tap. In the particular embodiment of FIR 51 in FIG. 5 according to the invention, r(t) is first input into both the delay N−1 and the tap N−1 where PN coefficient $P_{N-1}$ is multiplied by r(t). Thereafter, r(t), which has undergone a delay operation at the delay N−1, is input into the delay N−2 for another delay operation, and into tap N−2, where PN coefficient $P_{N-2}$ is multiplied by r(t). This process is continued until the last delay and tap, which are the delay 1 and tap 1, respectively, as shown in FIG. 5. After undergoing PN coefficient multiplication at the taps (tap N−1, tap N−2, . . . , and tap 0) and delay operation at the delays (N−1, N−2, . . . and 1), the results are summed at summer 53 which then outputs the multipath response s(t) for further processing in the data matching filter DMF 42 (FIG. 4).

Figure 6:
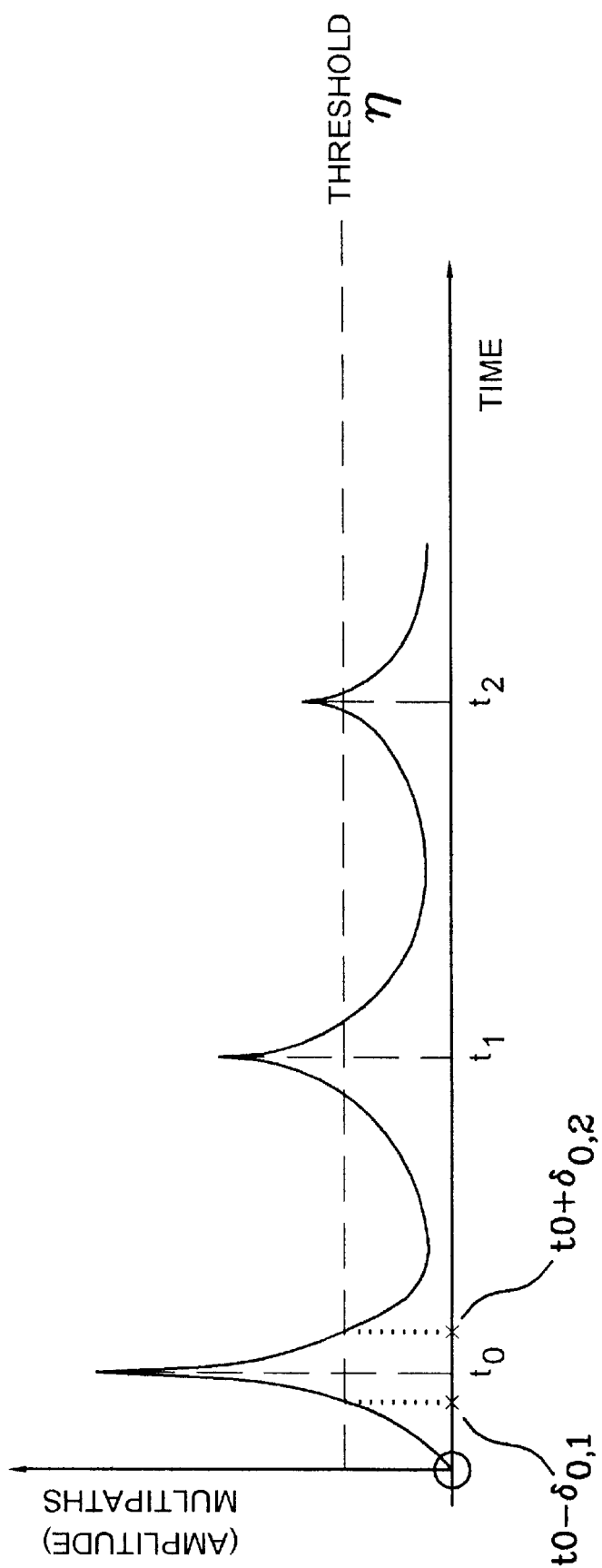
FIG. 6 is a diagram illustrating an exemplary threshold detection of a multipath response according to the invention.

FIG. 6 is a diagram that illustrates an exemplary threshold detection of the multipath response according to the invention, using a threshold detector such as the threshold detector 43 of FIG. 4. After enhancement of the multipath response at DMF 42 (FIG. 4) with complex conjugation and time reverse operations, exemplary multipaths 0, 1 and 2 at time t0, t1 and t2 are forwarded to threshold detector 43 (FIG. 4) for further processing. The output of DMF 42, which are the spike-like multipaths or peaks, first crosses the threshold η at time $t0-67_{0,1}$. After reaching a response peak at time t0, the output of DMF 42 crosses down the threshold η at time $t0+\delta_{0,2}$. Data signals in the multipath response between time $t0-\delta_{0,1}$ and $t0+\delta_{0,2}$ are recorded. The maximum response peak at time t0, which is the data signal with the best response, is located between time $t0-\delta_{0,1}$ and $t0+\delta_{0,2}$ and a corresponding coefficient in the PN code (which is known at both the transmitter 10 and the receiver 20) is assigned thereto. The maximum response peaks for other multipaths (e.g., multipaths 1 and 2 at time t1 and t2, respectively) are similarly located and corresponding PN code coefficients are assigned thereto. The phase is estimated and the maximum response peaks are then sampled at sampling frequencies, e.g., using sampler 47 of FIG. 4, corresponding to their respective timing points, e.g., time t0, t1 and t2 for multipaths 0, 1 and 2, respectively.

Figure 6A:
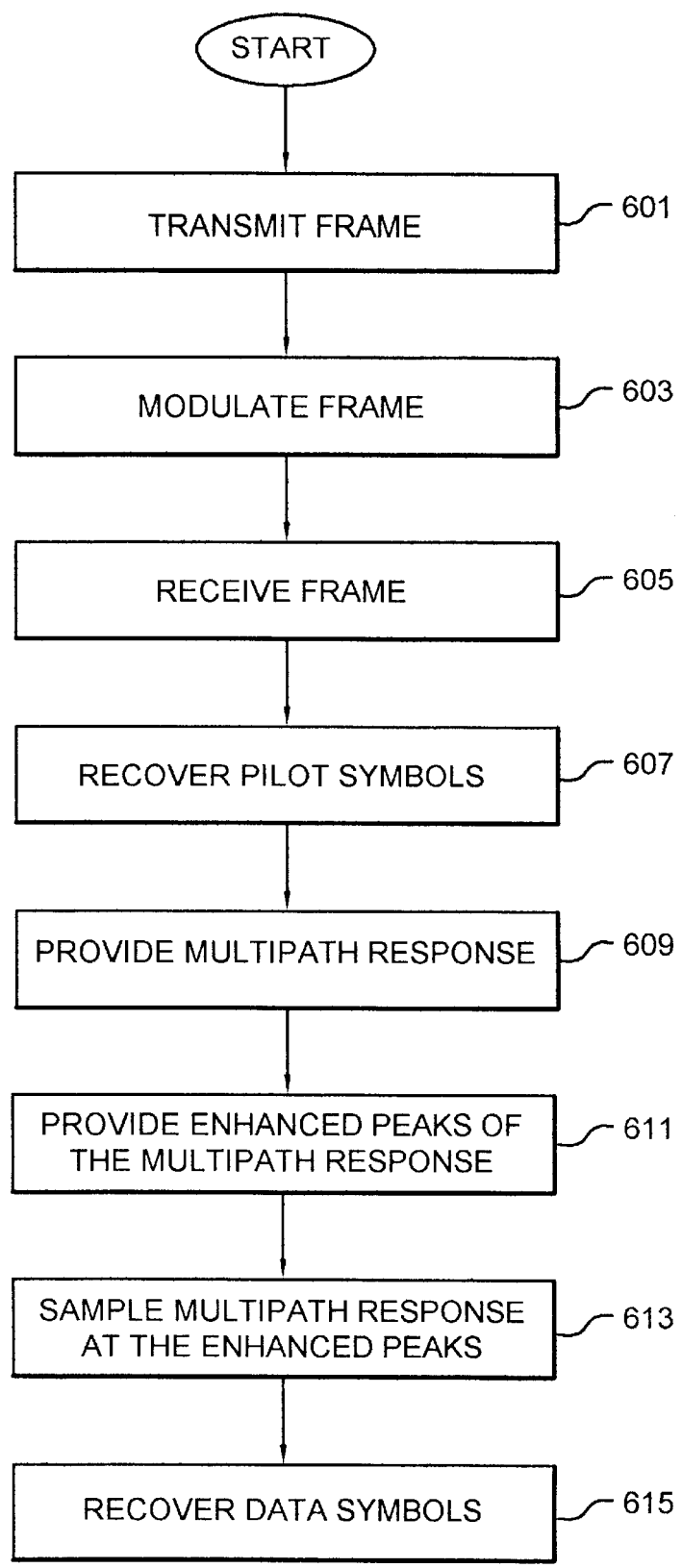
FIG. 6A is a flow diagram illustrating a preferred embodiment of the method of the invention.

FIG. 6A is a flow diagram that illustrates a preferred embodiment of the methodology of the invention. In step 601 a frame of data symbols and pilot symbols are transmitted, where the pilot symbols are inserted in the frame at known time intervals. The frame of data and pilot symbols is modulated using QPSK modulation in step 603. Once the frame is received (step 605), the pilot symbols are recovered (step 607) and a multipath response is provided for the received frame at the known time intervals of the pilot symbols (step 609). At this point, the multipath response is hump-like in appearance in terms of its amplitude versus time. Referring to step 611, the multipath response of the received frame is enhanced by complex conjugation and time reverse operations to provide enhanced peaks for the multipath response. The multipath response is sampled at each of the enhanced peaks (step 613) and the data symbols of the received frame are recovered using QPSK demodulation (step 615).

The methodology according to the invention described herein (and in particular with reference to FIGS. 4 and 6) can be expressed by formulas which are further detailed below. In a preferred embodiment according to the invention, the operations expressed by the formulas are performed by software programs and/or digital signal processing (DSP). The multipath response output s(t) from PCF 41 is expressed as follows:

$$s(t) = \sum_n^N d\left\lfloor \frac{n}{N} \right\rfloor h(t - nTc) \qquad \text{Eq. (3)}$$

where $$\left\lfloor \frac{n}{N} \right\rfloor$$

represents a flooring or modulo function that approximates $$\frac{n}{N}$$

to the lower of the two integers closest to the fraction $$\frac{n}{N}, \quad d\left\lfloor \frac{n}{N} \right\rfloor$$

represents a symbol or encoded bits for the nth chip in s(t), Tc is the sampling period for a chip in s(t), and the function h represents the channel response and filtering effects at time t−nTc. The function h(t) at the threshold detector 43 is an approximation of h(t). Since the PN code is known at the receiver 20, s(t) is time reversed and complex conjugated in the threshold detector 43, which are performed in software or DSP, as follows:

$$s(t) * h(t) = s(t) * h^*(-t) \qquad \text{Eq. (4)}$$
$$= \sum_n^N d\left\lfloor \frac{n}{N} \right\rfloor h(t - nTc) * h^*(-t)$$

Since h(t−nTc)★h*(−t) is equal to ∫h(τ−nTc)h(τ−t)dτ, the multipath response is sampled at time t−lTc, which is expressed as follows:

$$h(t - nTc) * h^*(t - lTc) = \begin{cases} 1 & n = l \\ \cong 0 & n \neq lMTc \end{cases} \qquad \text{Eq. (5)}$$

where M is an over sampling factor in sampling the multipath response and MTc is the chipping period for the sampling period Tc. The oversampling factor M is a quantitative factor representing the sampling rate for sampling the frame at a multiple of the sampling rate for a chip set for the wireless system. Hence, the maximum response peaks are selected in accordance with the following formula:

$$(s(t) * h(t))|_{t=lTc} \cong d\left\lfloor \frac{n}{N} \right\rfloor \qquad \text{Eq. (6)}$$

Once the maximum response peaks are selected, their respective phase is estimated and the multipath response sampled.

Figure 7:
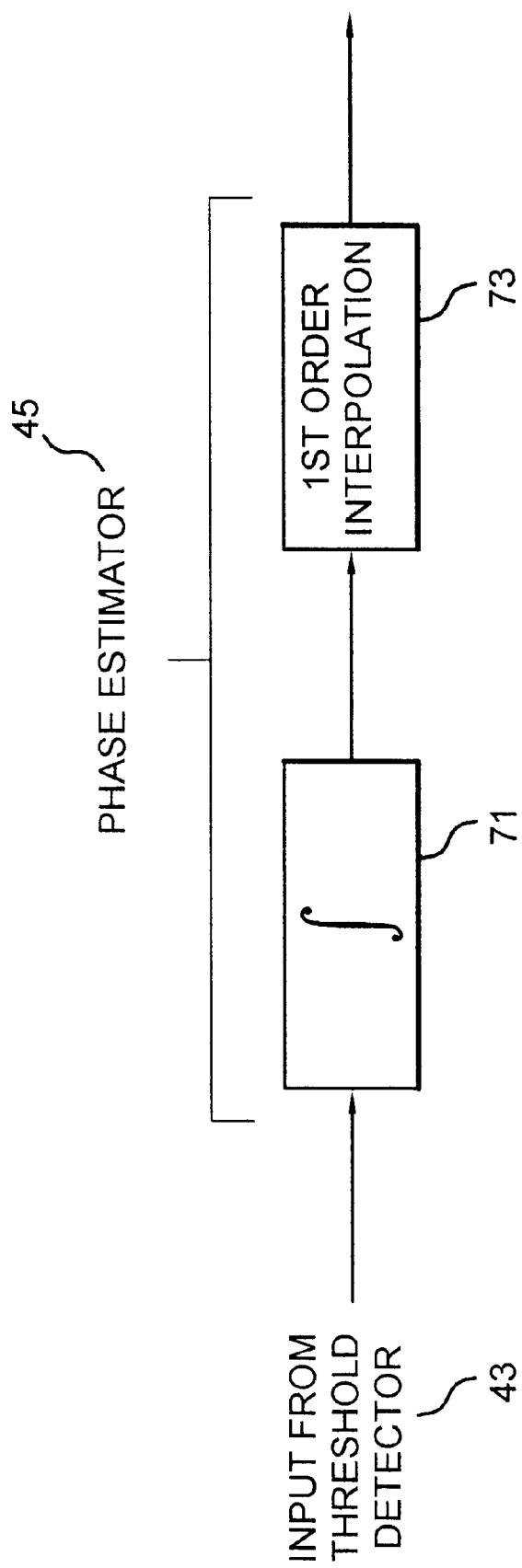
FIG. 7 is a diagram illustrating an exemplary phase estimator used in the receiver according to the invention.

FIG. 7 is a diagram illustrating an exemplary phase estimator according to the invention. Referring to FIG. 7, there is shown a phase estimator 45 (similarly shown in FIG. 4) which comprises an integrator 71 and an interpolator 73. The modulated frame of pilot and data symbols, after processing in PCF 41, DMF 42, and the threshold detector 43, are input into the phase estimator 45 (at the integrator 71) for estimating the phase for the enhanced multipath response peaks. Using the integrator 71, the phase is estimated, which can be expressed in the following relationship:

$$\xi_{l,k} = \frac{1}{N} \sum_{m=0}^{P-1} \phi(m+kN) \quad \text{(Eq. (7))}$$

where $\xi$ represents the phase to be estimated for a time point between time 1 and k, $\phi$ represents the known phase of the multipath response at the time points adjacent to the phase to be estimated, P is the number of pilot symbols and N is the number of pilot and data symbols in the modulated frame transmitted from the transmitter 10. However, the integrator 71 cannot properly estimate the phase for all the timing points in the multipath response. In particular, the integrator 71 cannot provide phase estimation at time t=(m+kN)M for M=P, P+1, . . . , and N−1. The interpolator 73, which is an interpolator of the first order or higher, is used to estimate the phase at time t=(m+kN)M for m=P, P+1, . . . , and N−1. The interpolator 73 interpolates the phase for a particular time point based on the estimated phases of the adjacent time points in the multipath response. After the respective phase is estimated and interpolated for the multipath response peaks, they are sampled which results in the recovery of data symbols in the frame originally transmitted from the transmitter 10 to the receiver 20.

Figure 8A:
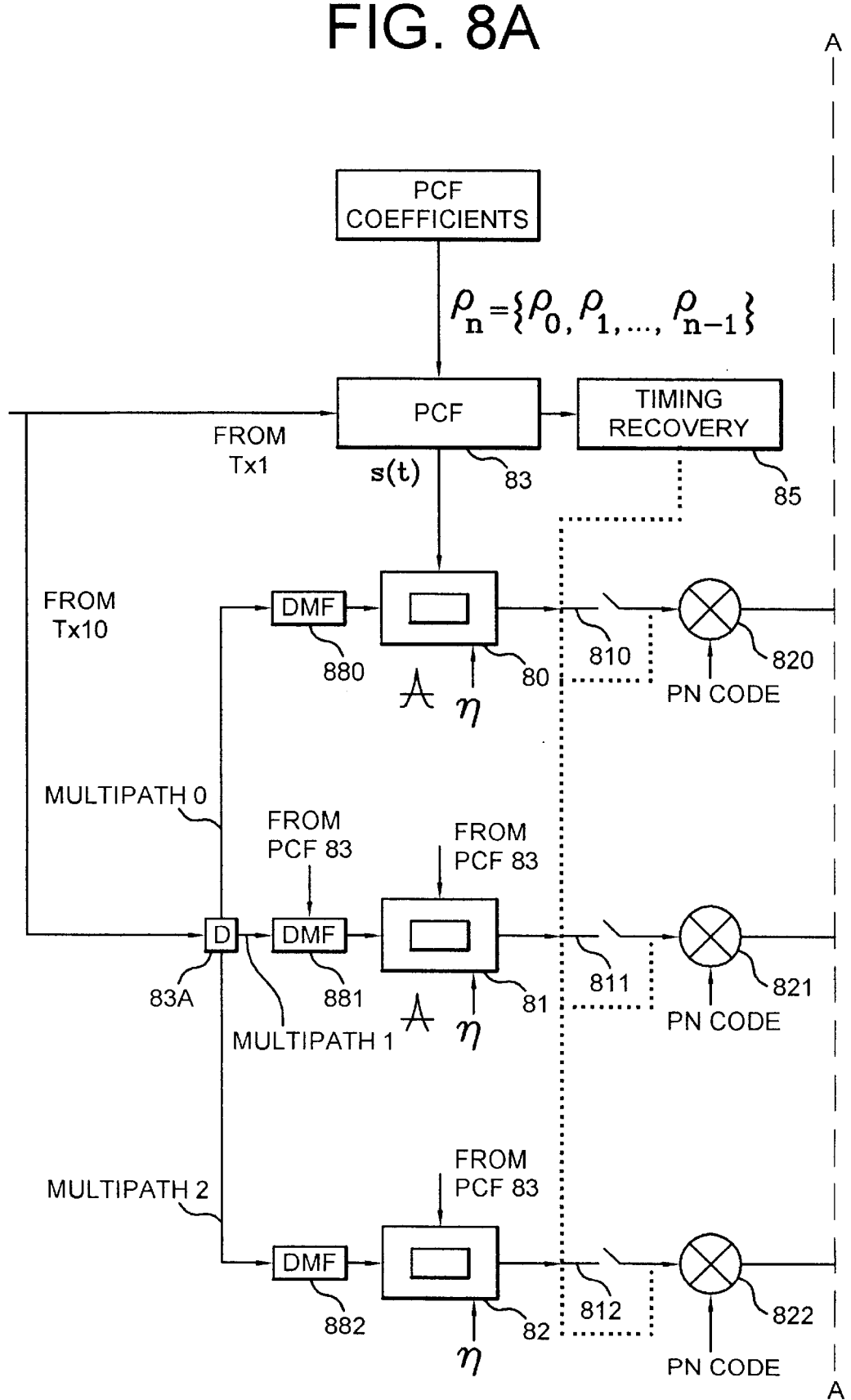
FIGS. 8A and 8B are diagrams illustrating another embodiment of the QPSK demodulator according to the invention.
Figure 8B:
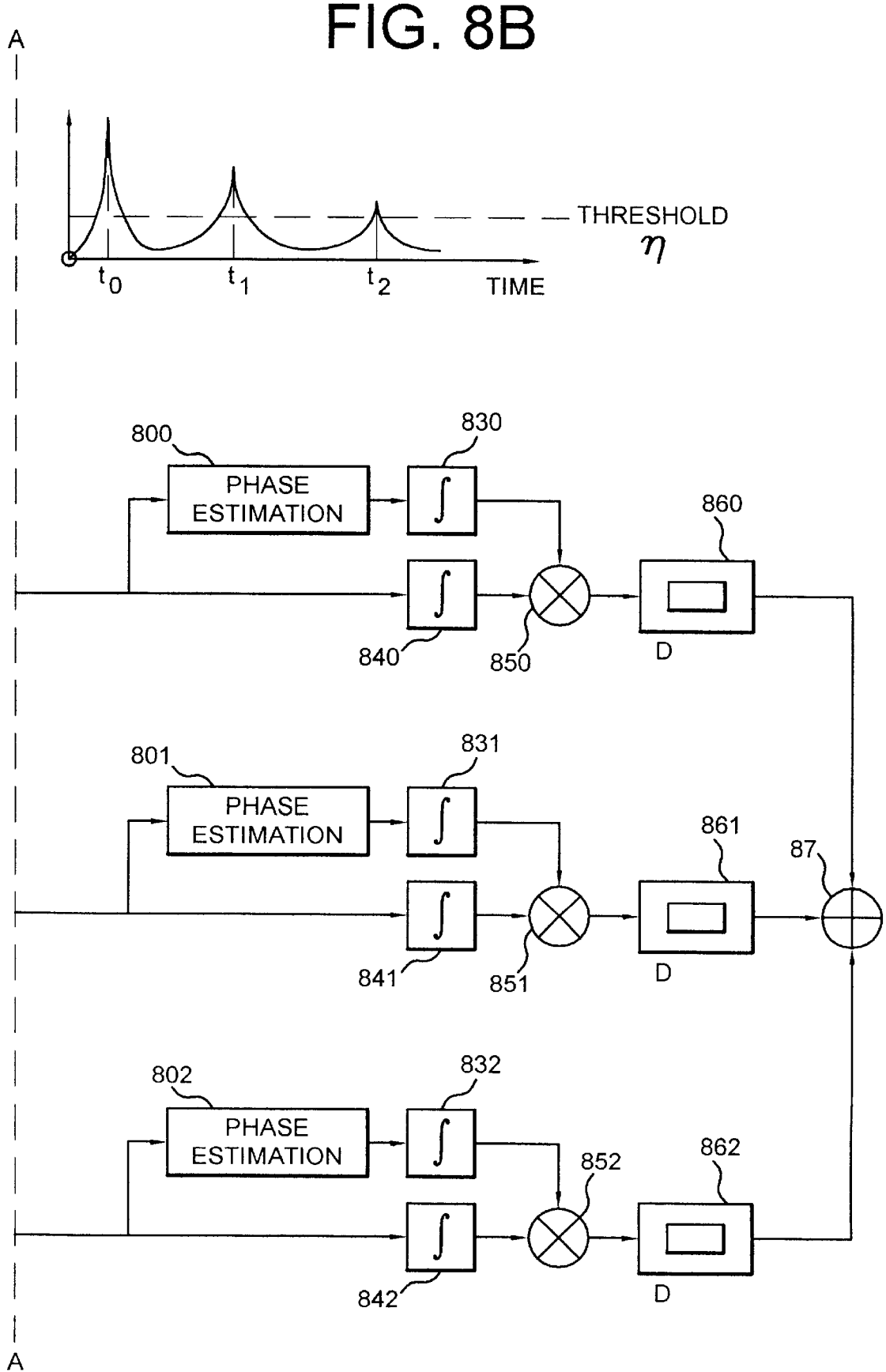

FIGS. 8A and 8B are diagrams illustrating an exemplary embodiment of the QPSK demodulator according to the invention. The data from the transmitter 10 is input into a pilot correlation filter PCF 83 that recovers the pilot symbols in the frame transmitted from the transmitter and generates a multipath response s(t) having exemplary multipaths 0, 1 and 2 which are hump-like in appearance. An embodiment of PCF 83, which is a finite impulse response (FIR) filter, is described herein in conjunction with FIG. 5. Using coefficients Pn={P0, P1, . . . , Pn−1} of the PN code, which are known at transmitter 10 and receiver 20, PCF 83 outputs the multipath response of s(t) with the hump-like multipaths 0, 1 and 2. The multipaths 0, 1 and 2 are sharpened into spikes or peaks by DMF 880, 881 and 882, respectively, by time reverse and complex conjugation operations. The multipaths 0, 1 and 2 are then processed for threshold detection in the threshold detectors 80, 81, and 82, respectively. An exemplary DMF and threshold detector is the DMF 42 and threshold detector 43 (FIG. 4), respectively. Using a threshold η, the maximum responses peaks for multipaths 0, 1 and 2 are located at the threshold detectors 80, 81 and 82, respectively. The multipath response s(t) from PCF 83 is also input into timing recovery current 85, which recovers the timing points for the pilot symbols since their timing during QPSK modulation is known in both the transmitter and the receiver. Once the maximum response peaks are located, the filters 810, 811 and 812 respectively filter multipaths 0, 1 and 2 at timing points corresponding to their respective maximum response peaks.

In accordance with QPSK, the PN code, which is known both at the transmitter 10 and the receiver 20, is multiplied with the maximum response peaks of multipaths 0, 1 and 2 in the multipliers 820, 821 and 822, respectively, to despread or decode the multipath response. Multipaths 0, 1 and 2 are then forwarded to phase estimators 800, 801 and 802, respectively, to estimate and interpolate the proper phase for sampling at the maximum response peaks, which are described herein in conjunction with FIG. 7. The multipath responses 0, 1, and 2 are applied to integrators 840, 841 and 842. Also, the outputs of estimators 800, 801 and 802 are processed in integrators 830, 831 and 832 for multipaths 0, 1 and 2, respectively. The outputs of integrators 830, 831 and 832 for the estimated (or interpolated phase) are multiplied with the outputs of integrators 840, 841 and 842 for multipaths 0, 1 and 2 in the multipliers 850, 851 and 852, respectively. Multipaths 0, 1 and 2 with the maximum response peaks and the proper phase from multipliers 850, 851 and 852 are then delayed at the delays 860, 861 and 862, respectively, and added at the summer 87 to provide an output where the data symbols from the transmitter 10 are recovered.

Although the invention has been particularly shown and described in detail with reference to the preferred embodiments thereof, the embodiments are not intended to be exhaustive or to limit the invention to the precise forms disclosed herein. It will be understood by those skilled in the art that many modifications in form and detail may be made without departing from the spirit and scope of the invention. Similarly, any process steps described herein may be interchangeable with other steps to achieve substantially the same result. All such modifications are intended to be encompassed within the scope of the invention, which is defined by the following claims and their equivalents.

We claim:

1. A wireless communication system, comprising:
    a transmitter transmitting a frame of data symbols and pilot symbols, where the pilot symbols are inserted in the frame at known time intervals;
    a QPSK modulator modulating the frame of data symbols and pilot symbols using quadrature phase shift keying (QPSK) modulation;
    a receiver receiving the frame of data symbols and pilot symbols from the transmitter;
    a pilot correlation filter recovering the pilot symbols and providing a multipath response of the frame of data and pilot symbols at the known time intervals of the pilot symbols;
    data matching filter enhancing the multipath response and providing an enhanced multipath response with a plurality of enhanced peaks;
    a sampler sampling the enhanced multipath response at each of the enhanced peaks and producing a sampled and enhanced multipath response; and
    a QPSK demodulator demodulating the sampled frame of data and pilot symbols and recovering the data symbols using quadrature phase shift keying (QPSK) demodulation based on the sampled and enhanced multipath response.

2. The system of claim 1, wherein the frame of data symbols and pilot symbols is transmitted in the forward link and the reverse link.

3. The system of claim 1, wherein the pilot correlation filter is a finite impulse response (FIR) filter.

4. The system of claim 1, wherein the data matching filter enhances the multipath response by time reversing and complex conjugating the multipath response.

5. The system of claim 1, further comprising a threshold detector located between the data matching filter and the sampler for locating a maximum response peak at a time point in the multipath response and assigning a pseudorandom noise code coefficient to the maximum response peak.

6. The system of claim 1, further comprising a phase estimator located before the sampler for estimating phases of the enhanced peaks.

7. The system of claim 5, further comprising a phase estimator located between the threshold detector and the sampler for estimating phases of the enhanced peaks.

8. A method for transmitting data symbols from a transmitter to a receiver in a wireless communication system, comprising the steps of:

transmitting a frame of data symbols and pilot symbols, where the pilot symbols are inserted in the frame at known time intervals;

modulating the frame of data symbols and pilot symbols using quadrature phase shift keying (QPSK) modulation;

receiving the frame at the receiver;

recovering the pilot symbols of the frame;

providing a multipath response of the frame at the known time intervals of the pilot symbols;

enhancing the multipath response by providing a plurality of enhanced peaks of the multipath response;

sampling the multipath response at each of the enhanced peaks; and recovering the data symbols using quadrature phase shift keying (QPSK) demodulation based on the sampled and enhanced multipath response.

9. The method of claim 8, wherein the frame of data symbols and pilot symbols is transmitted in the forward link and the reverse link.

10. The method of claim 8, wherein the pilot symbols of the frame are recovered by a finite impulse response (FIR) filter.

11. The method of claim 8, wherein the step of enhancing the multipath response comprises the steps of time reversing and complex conjugating the multipath response.

12. The method of claim 8, further comprising the steps of:

locating a maximum response peak at a time point in the multipath response; and assigning a pseudorandom noise code coefficient to the maximum response peak.

13. The method of claim 8, further comprising the step of estimating phases of the enhanced peaks.

14. A receiver in a wireless communication system, the receiver receiving a frame of data symbols and pilot symbols from a transmitter where the pilot symbols are inserted in the frame at known time intervals, the receiver comprising:

a pilot correlation filter recovering the pilot symbols and providing a multipath response of the frame of data and pilot symbols at the known time intervals of the pilot symbols;

a data matching filter enhancing the multipath response and providing an enhanced multipath response with a plurality of enhanced peaks;

a sampler sampling the enhanced multipath response at each of the enhanced peaks; and a QPSK demodulator demodulating the sampled frame of data and pilot symbols and recovering the data symbols using quadrature phase shift keying (QPSK) demodulation based on the sampled and enhanced multipath response.

15. The receiver of claim 14, wherein the pilot correlation filter is a finite impulse response (FIR) filter.

16. The receiver of claim 14, wherein the data matching filter enhances the multipath response by time reversing and complex conjugating the multipath response.

17. The receiver of claim 14, further comprising a threshold detector located between the data matching filter and the sampler for locating a maximum response peak at a time point in the multipath response and assigning a pseudorandom noise code coefficient to the maximum response peak.

18. The receiver of claim 14, further comprising a phase estimator located before the sampler for estimating phases of the enhanced peaks.

19. The receiver of claim 17 comprising a phase estimator located between the threshold detector and the sampler for estimating phases of the enhanced peaks.

* * * * *